United States Patent Office 3,605,688
Patented Sept. 20, 1971

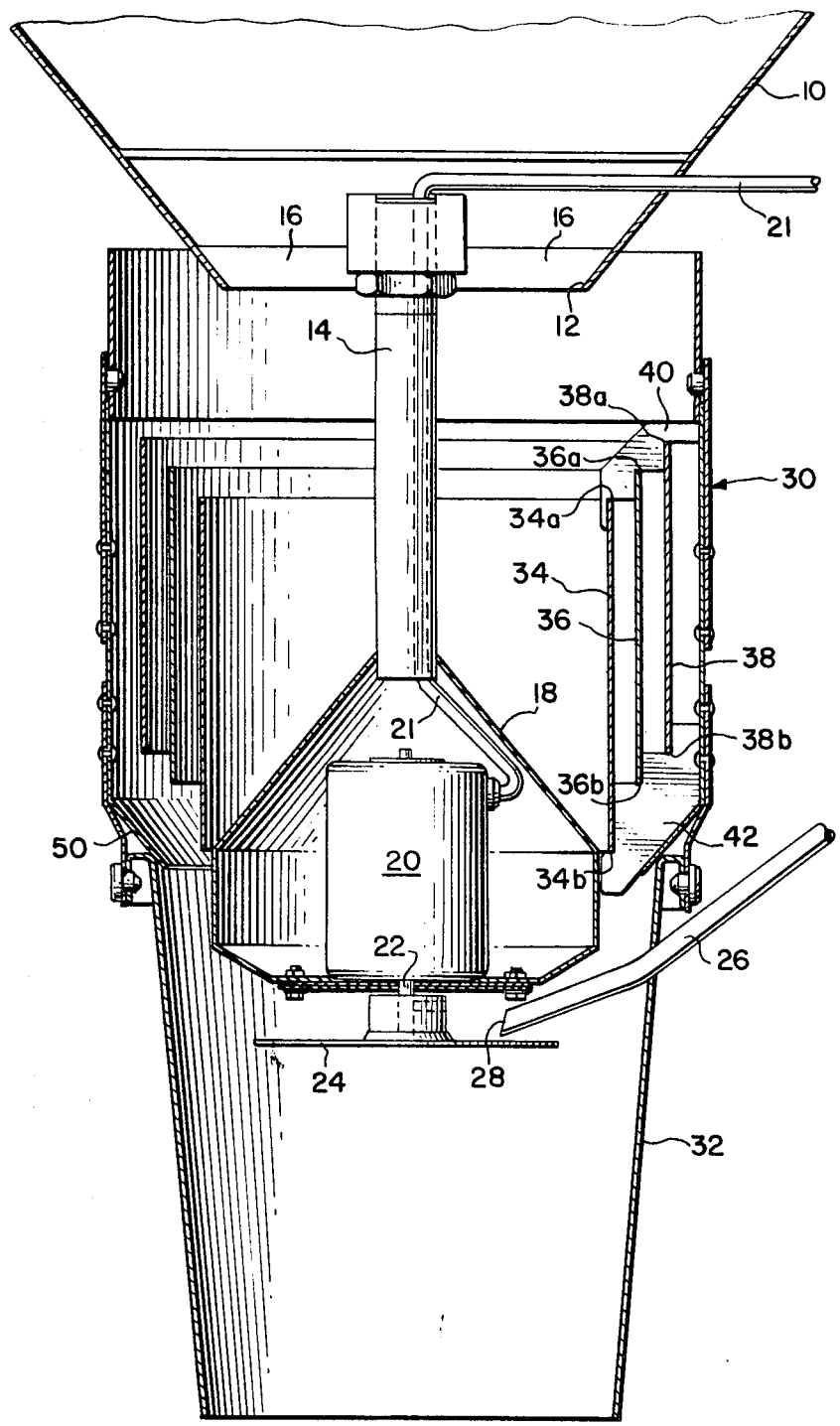

3,605,688
SEED TREATING MACHINE
Åke E. Hedén, Saltsjö-Boo, and Ulf Ö. Ulfvarson Lidingö, Sweden, assignors to AB Casco, Stockholm, Sweden
Filed Jan. 24, 1969, Ser. No. 793,674
Claims priority, application Sweden, Jan. 26, 1968, 1,042/68
Int. Cl. B05c 5/00
U.S. Cl. 118—303  5 Claims

ABSTRACT OF THE DISCLOSURE

A feed hopper includes a bottom discharge opening which discharges seeds into a tubular body means. A seed distributing cone is disposed at a central part of the body means beneath the hopper discharge. A disc is rotatably supported beneath the cone and means is provided for feeding treating fluid onto such disc. Flow control means is disposed outwardly of the cone and includes a plurality of spaced generally cylindrical concentric tubular members, the upper edges of the outer cylindrical members being disposed vertically above the upper edges of the cylindrical members disposed inwardly thereof. These cylindrical members are spaced from the cone and from one another so as to provide uniform flow of seeds around said disc at varying rates of feed.

BACKGROUND OF THE INVENTION

The present invention relates to seed treating machines for treating seeds with a suitable fluid such as a chemical insecticide and fungicide for preplanting treatment of seeds, especially wheat, corn, oats, flax and sugar beet seeds.

Known types of seed treating machines employ a suitable feeding mechanism such as a rotating metering means or a dual compartment metering member. This feeding means is secured to a housing having a non-rotating or a rotating seed distributing cone supported therein below the feeding means. A horizontally disposed rotatable disc is in turn disposed beneatth the cone for distributing liquid chemicals in the form of a fine mist onto the seeds discharged from the cone.

In order to obtain uniform distribution of the seeds over the cone, an annular collar is provided, and the space between the collar and the cone is adjusted according to the treating capacity required. The spacing is adjusted by raising or lowering the collar or the cone with respect to one another in order to adjust the annular opening through which the seeds are discharged for the desired rate of flow.

In practical operation, it is difficult in carrying out this adjustment of the collar with respect to the cone to obtain an accurate size of the annular discharge opening. If the discharge opening is too narrow, a few seeds are enough to start a slowly accelerating backing up of the seeds, while on the other hand, if the discharge opening is too large, a pulsating stream of seeds passes by the aforementioned disc.

SUMMARY OF THE INVENTION

The present invention provides an improved seed treating machine wherein adjustment of the flow control members as required in the prior art is eliminated and wherein the discharging operation is carried out automatically for varying rates of feed without any adjustments whatsoever.

The flow control means of the present invention comprises a plurality of tubular members which are generally cylindrical in construction and which are concentrically disposed. These tubular members are positioned outwardly of the seed distributing cone, the innermost one of these tubular members being spaced a predetermined distance from the cone, and the remaining tubular members being disposed a predetermined distance from one another and the innermost tubular member which is greater than the distance from the cone to the innermost tubular member.

The upper edge of the outermost tubular member is disposed vertically above the upper edge of the next adjacent inner tubular member, and this latter tubular member has the upper edge thereof in turn disposed vertically above the upper edge of the next adjacent inner tubular member. Accordingly, the tubular members are disposed in staggered relationship with respect to one another.

The innermost tubular member is spaced from the seed distributing cone so as to define an annular slot which will permit seeds to be discharged therethrough at the lowest feeding capacity of the machine. As the rate of feed of seeds into the machine is increased, the seeds will build up within the innermost tubular member above the cone until the seeds flow over the upper edge of the innermost tubular member and fall downwardly through the annular space between the innermost tubular member and the tubular member disposed immediately outwardly thereof. This creates a uniformly falling annular curtain of seeds which will join with the annular curtain of seeds falling through the slot between the cone and the innermost tubular member.

If the rate of feed of the seeds into the machine is still further increased beyond the capacity which can fall through the slot between the innermost tubular member and the cone as well as between the innermost tubular member and the tubular member disposed immediately outwardly thereof, the seeds will build up within the annular space between the two aforementioned tubular members until the seeds overflow into the annular space between the intermediate tubular member and the outermost tubular member in the embodiment illustrated. This produces still another uniformly falling curtain of seeds which will unite with the aforementioned falling curtains of seeds. If still higher capacities of seed are required, additional tubular members may be disposed in spaced concentric relationship outside of the aforementioned tubular members with each tubular member having the upper edge thereof disposed vertically above the upper edges of the tubular members disposed inwardly thereof.

The overall arrangement of the present invention has proved in actual operation to automatically provide a uniform discharge at widely varying rates of feed.

BRIEF DESCRIPTION OF THE DRAWING

The drawing illustrates a vertical section through a seed treating machine according to the present invention.

DESCRIPTION OF THE PREFERRED EMBODIMENT

Referring now to the drawing, a downwardly tapering feed hopper 10 is provided with a discharge opening 12 at the lower end thereof. A hollow shaft 14 is suspended from the hopper by brackets 16 and supports a seed distributing cone 18 at the lower end thereof. An electric motor 20 is in turn supported within the lower part of the cone, and electrical lead means 21 extends upwardly through shaft 14 and outwardly of the hopper to a suitable source of electrical energy. Motor 20 includes an output shaft 22 to which is secured a horizontally disposed disc 24.

A conduit 26 is connected with a suitable source of treating fluid such as a chemical insecticide and fungicide or the like. The lower end 28 of conduit 26 is open and is adapted to discharge treating fluid onto the upper surface of disc 24 which is rapidly rotated by motor 20 so as to form a fine mist of treating fluid for coating the seeds.

A tubular body means 30 is disposed in spaced surrounding relationship to the aforementioned components, and the lower end of the body means supports a downwardly and inwardly tapering collecting funnel portion 32 through which the treated seeds drop. A suitable means is connected to the lower end of the collecting funnel for receiving the seeds and may comprise a bagging sleeve or a device for conveying the seeds to a silo and the like.

The flow control means of the invention includes a plurality of spaced tubular members shown as being three in number and identified by reference characters 34, 36 and 38. These tubular members are substantially cylindrical in configuration and are concentrically positioned. It will be noted that the distributing cone 18 is disposed centrally within the innermost tubular member 34. The tubular members are supported in the operative position illustrated by suitable spaced brackets 40 and 42 supported by the aforementioned body means 30.

It will be noted that the upper edge 36a of the intermediate tubular member 36 is disposed vertically above the upper edge 34a of the innermost tubular member 34. The upper edge 38a of the outermost tubular member 38 is in turn disposed vertically above the upper edge 36a of the intermediate tubular member 36. While three tubular members have been illustrated, it is apparent that the number of tubular members may be increased as required according to the desired capacity of the machine.

It will further be noted that the lower edge 34b of the innermost tubular member 34 is disposed vertically below the lower edge 36b of the intermediate tubular member 36, and this lower edge 36b is in turn disposed vertically below the lower edge 38b of the outermost tubular member 38.

The width of the annular slot between the lower edge 34b of the innermost tubular member and cone 18 is about 10 millimeters when treating wheat wherein the machine has a capacity of about four tons per hour. In such a construction, the width of the annular slot between tubular members 34 and 36 as well as the width of the annular slot between tubular members 36 and 38 is about 20 millimeters.

A collecting and concentrating downwardly tapering ring 50 is supported by tubular body means 30, this ring being disposed beneath the annular space between the two outermost tubular members 36 and 38 as well as being disposed beneath the annular space between tubular member 38 and tubular body means 30. This ring serves to collect and concentrate seeds falling through these annular spaces. The seeds will engage the ring and be directed inwardly so as to be concentrated before the seeds pass disc 24.

The amount of seeds discharged by the hopper is metered by any suitable conventional metering mechanism such as a cell feeder or a double compartment balance. A cell feeder for example will ensure a uniform flow of seeds into the machine. A conventional fluid metering mechanism is provided for metering the fluid fed through conduit 26 onto the disc 24, this fluid metering mechanism being connected with the seed metering mechanism so as to ensure that a proper amount of fluid is fed into the machine in proportion to the amount of seeds being treated during a particular time interval so that proper coverage of the individual seeds will be obtained. In other words, the fluid is metered in accordance with the volume of the seeds fed into the machine so that the amount of fluid fed into the machine has a constant ratio to the amount of seeds fed into the machine regardless of the type of seed being treated.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A seed treating machine comprising a feed hopper open at the bottom thereof to define a discharge, a seed distributing cone spaced below said hopper discharge, a disc disposed beneath said cone, means for rotating said disc, means for feeding treating fluid onto said disc, and flow control means spaced outwardly of said cone, said flow control means including a plurality of spaced tubular members, one of said tubular members being disposed outwardly of another of said tubular members, the upper edge of said one tubular member being disposed vertically above the upper edge of said other tubular member, the lower edge of said one tubular member being disposed vertically above the lower edge of said other tubular member.

2. A seed treating machine comprising a feed hopper open at the bottom thereof to define a discharge, a seed distributing cone spaced below said hopper discharge, a disc disposed beneath said cone, means for rotating said disc, means for feeding treating fluid onto said disc, and flow control means spaced outwardly of said cone, said flow control means including a plurality of spaced tubular members, said tubular members comprising at least three substantially cylindrical concentric members, the upper edge of the outermost cylindrical member being disposed above the upper edge of the next adjacent inner tubular member, and the upper edge of said next adjacent inner tubular member in turn being disposed vertically above the upper edge of still another adjacent inner tubular member.

3. Apparatus as defined in claim 2 wherein said cone is centrally positioned within the innermost one of said cylindrical members.

4. A seed treating machine comprising a feed hopper open at the bottom thereof to define a discharge, a seed distributing cone spaced below said hopper discharge, a disc disposed beneath said cone, means for rotating said disc, means for feeding treating fluid onto said disc, and flow control means spaced outwardly of said cone, said flow control means including a plurality of spaced tubular members, said tubular members comprising a plurality of concentrically arranged cylindrical members the innermost one of which is spaced a predetermined distance from said cone, the remaining tubular members being spaced a greater distance from one another and said innermost tubular member, the tubular members extending above the upper portion of said cone and being spaced below the hopper discharge.

5. A seed treating machine comprising a feed hopper open at the bottom thereof to define a discharge, a seed distributing cone spaced below said hopper discharge, a disc disposed beneath said cone, means for rotating said disc, means for feeding treating fluid onto said disc, and flow control means spaced outwardly of said cone, said flow control means including a plurality of spaced tubular members, said tubular members being substantially concentric with one another and including a pair of outermost tubular members, a collecting and concentrating downwardly tapered ring being disposed beneath the space between said outermost tubular members for collecting and concentrating seeds falling through said space.

References Cited

UNITED STATES PATENTS

| | | | |
|---|---|---|---|
| 2,823,904 | 2/1958 | Gustafson | 118—303X |
| 3,155,542 | 11/1964 | Cordell et al. | 118—303 |
| 3,288,052 | 11/1966 | Hough | 239—223X |

JOHN P. McINTOSH, Primary Examiner